3,374,199
NON-BLOCKING POLYOLEFIN COMPOSITIONS
Hardy E. Ross and Kenneth C. Finster, Lake Jackson, Tex., assignors to The Dow Chemical Company, Midland, Mich., a corporation of Delaware
No Drawing. Continuation-in-part of application Ser. No. 177,206, Mar. 5, 1962. This application Nov. 1, 1965, Ser. No. 505,987
6 Claims. (Cl. 260—41)

ABSTRACT OF THE DISCLOSURE

A film-forming composition having a reduced tendency to blocking comprising a resinous olefin polymer and between about 0.02 and about 0.5 percent by weight based on the composition of finely divided calcium carbonate particles of a size within the range greater than 1 micron and up to about 100 microns.

---

This application is a continuation-in-part of a copending application, Ser. No. 177,206, filed Mar. 5, 1962, now abandoned.

This invention relates to olefin polymers of improved properties and more particularly to polyolefin compositions containing calcium carbonate as an improved non-blocking agent and to pellets, granules, sheet, film and like articles, composed of such compositions and which have non-blocking characteristics.

One of the problems occurring in the manufacture, handling and use of resinous polymers such as polyethylene particularly in the form of thin films is the tendency of such products to block. Blocking is the property of two or more surfaces such as adjacent film layers in a roll or stack of film to adhere to each other particularly under pressure and to resist separation. Such behavior causes difficulties in, and often prevents, the unwinding of film from a roll, lifting of single sheets from a stack, opening of lay-flat tubing and collapsed bags, and like operations in handling and using such products.

In accordance with the present invention, polyethylene and other resinous olefin polymer compositions and products having a reduced tendency to block are obtained from compositions comprising a small but effective proportionate amount of finely divided calcium carbonate. More particularly the present invention contemplates improved compositions and products thereof having reduced tendency to block which are composed of a normally solid resinous polymer of an olefin such as ethylene or propylene and from about 0.02 to about 0.5 percent by weight based on the composition of finely divided calcium carbonate particles whose size is critically greater than one micron and up to about 100 microns, preferably from about 2 to about 50 microns.

Any of the known normally solid resinous film-forming thermoplastic polymers of olefins, particularly such resinous polymers of ethylene or propylene which are prone to blocking, can be employed and improved in accordance with the present invention including the so-called low density polyethylene resins and the so-called high density polyethylene resins made by conventional polymerization processes. Suitable resinous polymers include linear and branched polymers, homopolymers, random and graft copolymers of two or more monomers, telomers, and blends thereof. The normally solid resins are distinguished in properties and utility from greases, waxes and rubbers.

The compositions of the present invention are prepared by any method suitable for obtaining a substantially uniform mixture of the normally solid resinous polymer and the calcium carbonate. Conventional apparatus such as Banbury mixers, heating rolls, mixing extruders, and the like and combinations thereof can be employed. Other additives conventionally incorporated in polyethylene compositions such as stabilizers, plasticizers, colorants, anti-static agents, slip agents, etc. can be incorporated into the polymer compositions prior to, together with, or after the incorporation of the calcium carbonate, provided that the additional ingredients are not of kinds or amounts which alter the efficacy of the calcium carbonate as antiblocking agent.

The polymer compositions comprising the calcium carbonate can then be fabricated into pellets, granules, strands and the like which can subsequently be further fabricated into sheets, films, tubing, packaging materials and other useful articles or such finally useful articles can be fabricated directly from the polymer-calcium carbonate compositions.

In general, the art has observed that the tendency of plastic products to block is not limited to any particular kind of resinous plastic material but is associated with the softness of the surfaces, low modulus or limpness in films, the temperature (which affects modulus and surface softness), the pressure, the extent of contact of the surfaces, and the duration of the exposure. Even materials which do not appreciably block at ordinary conditions may be prone to block at elevated temperatures or under severe conditions. The calcium carbonate antiblocking agent of the present invention is surprisingly effective in reducing the blocking tendency of compositions containing the same without adversely affecting the softness, modulus, clarity, extrusibility, etc. of the products and is effective both as to compositions which are otherwise prone to blocking at ordinary conditions and as to compositions which otherwise become prone to blocking under extreme conditions, e.g., of temperature, pressure, extent of contact, etc.

Unlike many finely divided solid particles which are nucleating agents in crystallizable thermoplastic polymers and which have a pronounced effect on the properties of products obtained by cooling and solidifying the molten or thermoplastified polymer, calcium carbonate particles of the kind here specified are not active in nucleation, do not affect the rate, kind or extent of crystallization, and do not affect the physical or mechanical properties of crystallizable polymer products containing such particles, except as to blocking as described herein.

The invention is particularly advantageous in the provision of self-supporting thin films having reduced tendency to block. In the preparation of improved film products, the present invention allows the use of conventional procedures for the fabrication of such products, e.g., by the so-called bubble blowing processes and the various kinds of melt extrusion, drawdown and quench processes. For the preparation of thin film products having improved resistance to blocking in accordance with the present invention, it is critically essential that the particle size of the calcium carbonate be greater than (not including) one micron and it is usually preferred to use calcium carbonate whose particle size is in the range from about 2 to about 50 microns and in amount of from about 0.02 to about 0.5 percent by weight based on the final composition.

Thin self-supporting films in accordance with the present invention have considerably less tendency to block than do comparable films not containing the added calcium carbonate anti-blocking agent. Accordingly, film products in accordance with this invention are readily unwound from rolls and separated from each other in stacks and the like. Such products are advantageously used in packaging machinery, and prefabricated collapsed bags made from such films are easily opened for filling.

Moreover, films in accordance with this invention are found to have excellent clarity and lack of haze. Furthermore, the advantageous properties shown by these compositions are retained even after prolonged aging or exposure to extreme conditions such as elevated temperatures.

The following examples illustrate the invention and show preferred embodiments and modes of practicing the invention but are not to be construed as limiting the scope thereof.

*Examples 1–6*

Thin self-supporting films were made by conventional bubble-blowing of polyethylene compositions containing diverse calcium carbonate materials hereinafter identified. The base polyethylene was a conventional low density polyethylene resin having a melt index of 2.0. The film compositions in accordance with this invention contained 0.25 percent by weight of calcium carbonate. In compounding the compositions, masterbatches were first prepared by mixing 5 percent by weight of calcium carbonate with the base resin, extruding the concentrate twice through a mixing extruder, and granulating. Final compositions were prepared by blending the masterbatch concentrate with more of the starting base resin to reduce the calcium carbonate concentration to 0.25 percent by weight, extruding and granulating the blend.

In Table I below are shown the particle size of the calcium carbonate used in each example, the blocking value in grams, and the clarity rating value for each of the film products.

The blocking test is carried out and the blocking value is determined as follows: Two film holders, each having a square flat surface of 14 square inches covered with a sample of the film to be tested for blocking, are placed together with the test films in full contact in a horizontal plane but without pressure. The lower film holder is held fixedly while the upper film holder is suspended from one end of the beam of a beam balance and counterpoised so that there is zero force between the film holders. The arrangement is such that weights applied to the balance beam exert a force tending to separate the film holders along a line normal to the contacting surfaces of the test film. The force in grams necessary to separate the film surfaces from contact with each other is taken at a measure of blocking, such force being proportionate to the tendency of the films to block.

The clarity test is carried out and the clarity value is determined as follows:

A narrow beam of light passing through slits passes through the film sample and the intensity of the transmitted light is measured by the voltage generated in a photocell. The photocell is driven across the transmitted beam from minimum intensity, through maximum intensity, and thence out again to minimum intensity. The photocell voltage is recorded on a standard recorder as one ordinate against cell travel as the other ordinate, thereby tracing a bell-shaped curve on the recorder chart. The apparatus is adjusted and calibrated so that, when no film is in the film holder (air transmission), the bell curve is nine inches high, i.e., the peak (maximum intensity) is nine inches above the base line (minimum intensity), and the width of the bell is approximately 1.3 inches when measured parallel to and 0.5 inch up from the base line. When the apparatus is so standardized, the operations are carried out with a test sample film in place in the film holder and the transmission curve is drawn for the film sample whose clarity is to be measured. From the resulting bell curve, the height (H) in inches of the peak (maximum intensity) of the bell above the base line is measured. The value of H is taken as a measure of film clarity. The highest clarity will have the highest H value since the transmitted light beam will be intense at maximum and sharp at the edges. Lack of clarity will be evident as a lower value of H.

All of the data in the examples of this application were determined on films whose thickness was approximately 1.5 mils.

TABLE I

| Example | Particle Size of CaCO₃, microns | Blocking Value | Clarity Value |
|---|---|---|---|
| 1 | 70 | 2.3 | 5.9 |
| 2 | 7 | 1.6 | 6.0 |
| 3 | 2 | 1.7 | 6.1 |
| 4 | 0.5 | 8.2 | 6.3 |
| 5 | 0.07 | 12 | 6.4 |
| 6 | 0.05 | 33 | 6.8 |
| Blank (no CaCO₃) | | 42 | 6.9 |

When these data of particle size and blocking values are plotted graphically on uniform rectilinear coordinates, it is seen that a sharp break occurs at slightly more than one micron particle size, above which the blocking values are much lower than those of compositions in which the particle size is below one micron. From these and other data it is found that calcium carbonate whose particle size is greater than one and up to about 100 microns, preferably from about 2 to about 50 microns, is advantageously useful for greatly reducing the tendency of the polyethylene film products to block while still preserving the clarity of the film.

In other experiments, proportionate amounts of calcium carbonate larger and smaller than that used in Examples 1–6 are employed. It is found that an extremely small amount, e.g., in the order of 200 parts per million (0.02 percent) of the effective grades of calcium carbonate in accordance with this invention, is efficacious in reducing the normal tendency of polyethylene film compositions to block. Very little, if any, loss of clarity of the films results from the use of such small but effective proportionate amounts of anti-block agent in accordance with this invention. Larger amounts, up to about 0.5 percent by weight, of the calcium carbonate provide even greater anti-blocking effects while providing films of excellent clarity. Still larger amounts, up to about 5 percent by weight of the anti-block agent, are used in making concentrates and masterbatches of polymer containing the anti-block agent.

*Example 7*

In this example, $CaCO_3$, particle size approximately two microns, was used as anti-block agent in a commercial grade low density polyethylene base resin having a melt index of two and containing 200 parts per million by weight of 2,6-di-tert.-butyl-4-methylphenol as an antioxidant and 500 parts per million by weight of oleamide as a slip agent. The antioxidant and slip agent, which are conventional ingredients of commercial grade polyethylene resins, are used here for illustration but are not essential to the present invention.

By procedures similar to those mentioned in connection with the preceding examples, the $CaCO_3$ was incorporated in the base resin at a concentration of 500 parts per million by weight. Thin films were blown from the resulting composition and, for purposes of contrast, also from the base resin containing the antioxidant and slip additive but no anti-blocking agent.

The blocking values and clarity values of the films were determined in the manner hereinbefore described. Haze values were determined in accordance with the standard procedure described and identified as ASTM D 1003–52 Method A. These values are set forth in Table II.

TABLE II

| Anti-Block Agent | Blocking Value | Clarity Value | Haze Value |
|---|---|---|---|
| None | 23 | 6.0 | 4.8 |
| CaCO₃, 500 p.p.m. | 8.5 | 5.9 | 4.9 |

*Example 8*

A copolymer of ethylene and vinyl acetate in weight ratio 94:6 respectively and having melt index of two and density of 0.924 gram per cubic centimeter was compounded with (by weight) 150 p.p.m. 2,6-di-tert.-butyl-4-methylphenol as antioxidant, 1000 p.p.m. oleamide as slip agent, and 500 p.p.m. calcium carbonate (particle size two microns) in accordance with this invention. The composition was extruded and granulated into granules which were free-flowing and non-caking on storage. The granules were extruded into self-supporting film which was clear, transparent and non-blocking.

*Example 9*

A blend of 80 parts polyethylene and 20 parts (both by weight) of a copolymer of ethylene and ethyl acrylate (ratio 80 ethylene to 20 ethyl acrcylate, by weight) is compounded with 500 p.p.m. of finely divided calcium carbonate (particle size about 1.2 microns) and granulated. The granules are free-flowing and non-caking. The granules are extruded into sheets which are clear and non-blocking.

*Example 10*

A resinous polymer of ethylene and about one percent propylene is prepared at high pressure, compounded with 1000 p.p.m. by weight of calcium carbonate whose particle size is about two microns, and extruded into film which is clear and non-blocking. Similar non-blocking films are obtained from similar compositions in which the calcium carbonate particle size is about 50 microns and about 100 microns, respectively.

*Example 11*

A resinous, isotactic polypropylene is compounded with 1000 p.p.m. by weight of calcium carbonate whose particle size is 2 microns and is extruded in a thin sheet and quick-quenched to form a clear film. The resulting film product is substantially non-blocking even at steam sterilization temperatures whereas films of unmodified composition exhibit pronounced blocking characteristics under such conditions.

*Example 12*

In order to demonstrate that $CaCO_3$ particles in accordance with this invention do not act as nucleating agents to affect the crystallinity of a polymer and thus do not affect important physical properties, an ethylene homopolymer having a melt index of 2 was compounded with various amounts of $CaCO_3$, about 2 micron particle size, and the resulting compositions were fabricated by conventional procedures into 1.5 mil blown films. These films were tested for density and impact strength; the latter was determined by freely dropping a variable weight dart from a distance of 26.5 inches to a tautly held specimen of the film being tested and ascertaining the weight in grams of the dart which causes any visible failure in 50 percent of the test specimens of that film. These data are recorded in Table III.

TABLE III

| Test No. | $CaCO_3$, p.p.m. by wt. | Film Properties | |
|---|---|---|---|
| | | Density, g./cc. | Impact Strength Dart Weight, grams |
| 1 | None | 0.9197 | 142 |
| 2 | 500 | 0.9198 | 144 |
| 3 | 1,000 | 0.9195 | 145 |
| 4 | 2,000 | 0.9197 | 143 |

These data show that $CaCO_3$ in accordance with this invention has no significant effect on the physical or mechanical properties of polyethylene which are crystallization-dependent.

For purposes of comparison, an ethylene homopolymer having melt index of 2 (but not containing any $CaCO_3$) was fabricated into films 1.25 inches thick by melt extrusion onto a chill roll. By varying the cooling rate, the degree of crystallization was varied. The densities and dart impact strength values of the resulting film products were determined and are shown in Table IV.

TABLE IV

| Test No. | Film Properties | |
|---|---|---|
| | Density, g./cc. | Impact Strength Dart Weight, grams |
| 5 | 0.9249 | 80 |
| 6 | 0.9264 | 75 |
| 7 | 0.9270 | 68 |
| 8 | 0.9285 | 55 |

From these data, and contrast thereof with those of Table III, it is seen that an increase in crystallinity (evidenced by increased density of the same resin) is accompanied by decrease in dart impact strength of the film.

In other tests of the invention, there are used other normally solid resinous film-forming thermoplastic polymers and, as anti-blocking agent therefor, finely divided calcium carbonate in accordance with this invention with substantially the same results in reducing the blocking tendency of such compositions in granules, pellets, sheeting, film, tubing, packaging materials, packaged goods, and the like. For instance, the specified anti-blocking agent is advantageously used in solid resinous polymers (including homopolymers, copolymers of two or more monomers, telomers, and blends thereof), especially polymers of monomers which are composed of at least a characterizing proportionate amount of at least one olefin, particularly olefins having from two to eight carbon atoms, specific examples of which are, in addition to the already exemplified ethylene and propylene, butene, pentene, hexene, heptene and octene.

What is claimed is:

1. A self-supporting film having substantially reduced film-to-film blocking characteristics comprising a normally solid resinous polymer of an olefin selected from the group consisting of ethylene and propylene, prone to blocking, and finely divided calcium carbonate being present substantially alone as a single ingredient to reduce the film-to-film blocking characteristics and whose particle size is sufficiently greater than one to improve the blocking value without acting as a nucleating agent to significantly affect the crystallinity and up to about 100 microns substantially uniformly dispersed through the film composition in amount from about 0.02 to about 0.5 percent by weight based on the composition and effective to reduce the blocking tendency of the film composition.

2. A self-supporting film in accordance with claim 1 having substantially reduced film-to-film blocking characteristics comprising a normally solid resinous polymer of ethylene, prone to blocking, and finely divided calcium carbonate whose particle size is from about 2 to about 50 microns substantially uniformly dispersed through the film composition in amount from about 0.02 to about 0.5 percent by weight based on the composition and effective to reduce the blocking tendency of the film composition.

3. A self-supporting film in accordance with claim 1 having substantially reduced film-to-film blocking characteristics comprising a normally solid resinous polymer of propylene, prone to blocking, and finely divided calcium carbonate whose particle size is from about 2 to about 50 microns substantially uniformly dispersed through the film composition in amount from about 0.02 to about 0.5 percent by weight based on the composition and effective to reduce the blocking tendency of the film composition.

4. A solid plastic film-forming composition comprising a normally solid resinous film-forming thermoplastic polymer of an olefin selected from the group consisting of ethylene and propylene, which polymer is prone to blocking, and finely divided calcium carbonate being present substantially alone as a single ingredient to reduce the film-to-film blocking characteristics and whose particle size is sufficiently greater than one to improve the blocking value without acting as a nucleating agent to significantly affect the crystallinity and up to about 100 microns substantially uniformly dispersed through the composition in amount from about 0.02 to about 0.5 percent by weight based on the composition and effective to reduce the blocking tendency of the composition.

5. A solid plastic film-forming composition in accordance with claim 4 comprising a normally solid resinous film-forming thermoplastic polymer of ethylene, prone to blocking, and finely divided calcium carbonate whose particle size is from about 2 to about 50 microns substantially uniformly dispersed through the composition in amount from about 0.02 to about 0.5 percent by weight based on the composition and effective to reduce the blocking tendency of the composition.

6. A solid plastic film-forming composition in accordance with claim 4 comprising a normally solid resinous film-forming thermoplastic polymer of propylene, prone to blocking, and finely divided calcium carbonate whose particle size is from about 2 to about 50 microns substantially uniformly dispersed through the composition in amount from about 0.02 to about 0.5 percent by weight based on the composition and effective to reduce the blocking tendency of the composition.

References Cited

UNITED STATES PATENTS

| | | | |
|---|---|---|---|
| 2,628,214 | 2/1953 | Pinkney et al. | 260—41 |
| 2,956,035 | 10/1960 | Mock | 260—41 |
| 2,991,264 | 7/1961 | Monroe et al. | 260—41 |
| 3,160,598 | 12/1964 | Delfosse | 260—41 |

ALLAN LIEBERMAN, *Primary Examiner.*